(12) United States Patent
Jouhier

(10) Patent No.: US 11,397,626 B2
(45) Date of Patent: Jul. 26, 2022

(54) ACCESSING WEB APPLICATIONS

(71) Applicant: Sage SAS, Paris (FR)

(72) Inventor: Bruno Claude Jean-Marie Jouhier, Paris (FR)

(73) Assignee: Sage SAS, Paris (FR)

( * ) Notice: Subject to any disclaimer, the term of this patent is extended or adjusted under 35 U.S.C. 154(b) by 99 days.

(21) Appl. No.: 16/912,931

(22) Filed: Jun. 26, 2020

(65) Prior Publication Data

US 2020/0409776 A1 Dec. 31, 2020

(30) Foreign Application Priority Data

Jun. 27, 2019 (EP) ..................................... 19182903

(51) Int. Cl.
| | | |
|---|---|---|
| *G06F 9/54* | (2006.01) | |
| *G06F 40/205* | (2020.01) | |
| *G06F 40/143* | (2020.01) | |
| *H04L 67/133* | (2022.01) | |

(52) U.S. Cl.
CPC ............ *G06F 9/547* (2013.01); *G06F 40/143* (2020.01); *G06F 40/205* (2020.01); *H04L 67/133* (2022.05)

(58) Field of Classification Search
None
See application file for complete search history.

(56) References Cited

U.S. PATENT DOCUMENTS

| | | | |
|---|---|---|---|
| 9,652,269 B2 * | 5/2017 | Prabhakar | |
| 2005/0132086 A1 * | 6/2005 | Flurry | |
| 2018/0173390 A1 * | 6/2018 | Dunne | |

* cited by examiner

*Primary Examiner* — Syed A Roni
(74) *Attorney, Agent, or Firm* — Burns & Levinson LLP; Daniel McGrath

(57) ABSTRACT

A method includes client application code which is deployed to a client device having a generic client library. The client application code has code for accessing a web service of a web application via a web application programming interface (API) and running the client application code on the client device to: communicate a web service operation call to the web API and receive a web service operation response from the web API via the interface. The generic client library has code defining a first proxy class within which is defined a generic operation method, configured such that, responsive to receipt of an operation name parameter corresponding to a web service operation performed by the web application from a function caller of the client application code, the operation method returns an operation function object providing the interface between the client application code and the web API.

16 Claims, 8 Drawing Sheets

ACCESSING WEB APPLICATIONS

CROSS-REFERENCE TO RELATED APPLICATIONS

The present application claims priority to EP application serial no. EP19182903.5, filed Jun. 27, 2019, herein incorporated by reference in its entirety.

TECHNICAL FIELD

The present invention relates to techniques for accessing, via web APIs, web services provided by web applications.

BACKGROUND

Modern computing applications frequently take advantage of one or more web applications provided by a third party.

Web applications provide features and functionality which are typically run remotely and on different systems to where the client application accessing the web application is being run.

In order to enable remote applications to communicate with web applications, the web application developer provides one or more application programming interfaces (APIs) which in the case of web applications are generally known as "web APIs".

A web API provides the interface via which remote applications (client applications) communicate requests and receive responses from the web application.

Many web applications are complex necessitating correspondingly complex web APIs capable of receiving many different types of requests and providing many different types of responses.

To ease the burden on application developers developing applications which interact with web APIs, "client libraries" are typically provided that provide sections of code that encode requests to the web API and decode responses from the API in a format that is more readily usable by an application developer. Typically, the code provided in such client libraries is provided in such a way that service operations (i.e. features and functions) provided by the web application are exposed to the application developer as programming functions or methods.

Client libraries are either written manually, or, in some cases, generated automatically from "manifest files" associated with the web API and provided by the web application developer.

Large integrations (e.g. where a client application interacts with many web APIs or particularly complex web APIs) require large client libraries which can increase the size and complexity of the client application and add difficulties when developing and maintaining the client application, particularly if the web API is updated frequently.

SUMMARY OF THE INVENTION

In accordance with a first aspect of the invention, there is provided a method of accessing a web service of a web application via a web API. The method comprises: deploying, to a client device, client application code comprising a generic client library, said client application code comprising code for accessing the web service of the web application via the web API and running the client application code on the client device to: communicate a web service operation call to the web API, running on a server device, via an interface, and receive a web service operation response from the web API via the interface. The generic client library comprises code defining a first proxy class within which is defined a generic operation method, said operation method configured such that responsive to receipt of an operation name parameter corresponding to a web service operation performed by the web application from a function caller of the client application code, the operation method returns an operation function object, said operation function object providing the interface between the client application code and the web API.

Optionally, the interface is implemented by a process comprising the steps of: communicating, by the function caller of the client application code, an input to the operation function object corresponding to the web service operation call; converting, by the operation function object, the input to an input payload suitable for receipt by the web API and processing by the web service; communicating, by the operation function object, the input payload to the web API with a corresponding operation name; receiving, by the operation function object, an output payload from the web API; converting, by the operation function object, the output payload to an output corresponding to the web service operation response, and communicating the output to the function caller of the client application code.

Optionally, the input to the operation function object communicated from the function caller of the client application code is a JavaScript object.

Optionally, the output from the operation function object communicated to the function caller of the client application code is a JavaScript object.

Optionally, the client application code is client application code that has been written in conjunction with a TypeScript definition file, said TypeScript definition file defining typing information associated with the web API, enabling the type compatibility of the JavaScript objects which are passed to and returned from the operation function object to be verified during development.

Optionally, the TypeScript definition file is a TypeScript definition file generated from manifest file associated with the web API.

Optionally, generating the TypeScript definition file comprises: parsing the manifest file to obtain a list of operations performed by the web service and definitions of input and output payloads associated with each operation; converting each of the definitions of input and output payloads into TypeScript interface definitions; defining a type for an operation function object associated with each operation; generating an interface definition for a service object that maps the operation names to their function types, and generating a module definition comprising the interface definition.

Optionally, the first proxy class is parameterized by a first defined type and the operation method is parameterized by a second defined type which is constrained to be a key of the first defined type, the first argument of the operation method being typed as 'second defined type' the return of the operation method being typed as 'first defined type[second defined type]'.

Optionally, the generic library comprises code implementing a convention to distinguish between XML elements and XML attributes in input JavaScript objects.

Optionally, the generic library is configured for an operation with a specific web API protocol.

Optionally, the web API protocol is one of SOAP, REST or GraphQL.

In accordance with a second aspect of the invention, there is provided a method of generating a TypeScript definition file for use in the method of the first aspect of the invention in which the application code has been written in conjunction with a TypeScript definition file. The method comprises: parsing a manifest file to obtain a list of operations performed by a web service and definitions of input and output payloads associated with each operation; converting each of the definitions of input and output payloads into TypeScript interface definitions; defining a type for a function associated with each operation; generating an interface definition for a service object that maps the operation names to their function types, and generating a module definition comprising the interface definition.

In accordance with a third aspect of the invention, there is provided a generic client library for use in a method according to the first aspect of the invention. The generic client library comprises computer code which when run on a suitable computing device defines a first proxy class within which is defined a generic operation method, wherein said operation method is configured such that responsive to receipt of an operation name parameter corresponding to a web service operation performed by a web service from a function caller of the application code, the operation method is configured to return an operation function object, said operation function object providing an interface between the function caller of the application code and a web API.

Optionally, the interface is implemented by a process comprising the steps of: receiving, from the function caller of the client application code, an input to the operation function object corresponding to a web service operation call; converting, by the operation function object, the input to an input payload suitable for receipt by the web API and processing by the web service; communicating, by the operation function object, the input payload to the web API with a corresponding operation name; receiving, by the operation function object, an output payload from the web API; converting, by the operation function object, the output payload to an output corresponding to the web service operation response, and communicating the output to the function caller of the client application code.

Optionally, the input to the operation function object communicated from the function caller of the client application code is a JavaScript object.

Optionally, the output from the operation function object communicated to the function caller of the client application code is a JavaScript object.

In accordance with examples of the invention, a technique is provided for interacting with web applications via web APIs.

Normally, an individual client library must be provided in the client application code for every web API called by a client application. However, in accordance with examples of the technique, a single generic client library is provided which can be used with multiple different web APIs. This can substantially reduce the size of parts of the client application code required to integrate with web APIs. Moreover, the process of integrating client application code with web applications is simplified because the conventional requirement of manual or automatic code generation which is normally required every time integration is required with a new or updated web API can be eliminated.

Various further features and aspects of the invention are defined in the claims.

BRIEF DESCRIPTION OF THE DRAWINGS

Embodiments of the present invention will now be described by way of example only with reference to the accompanying drawings where like parts are provided with corresponding reference numerals and in which.

DETAILED DESCRIPTION

Figure 1:
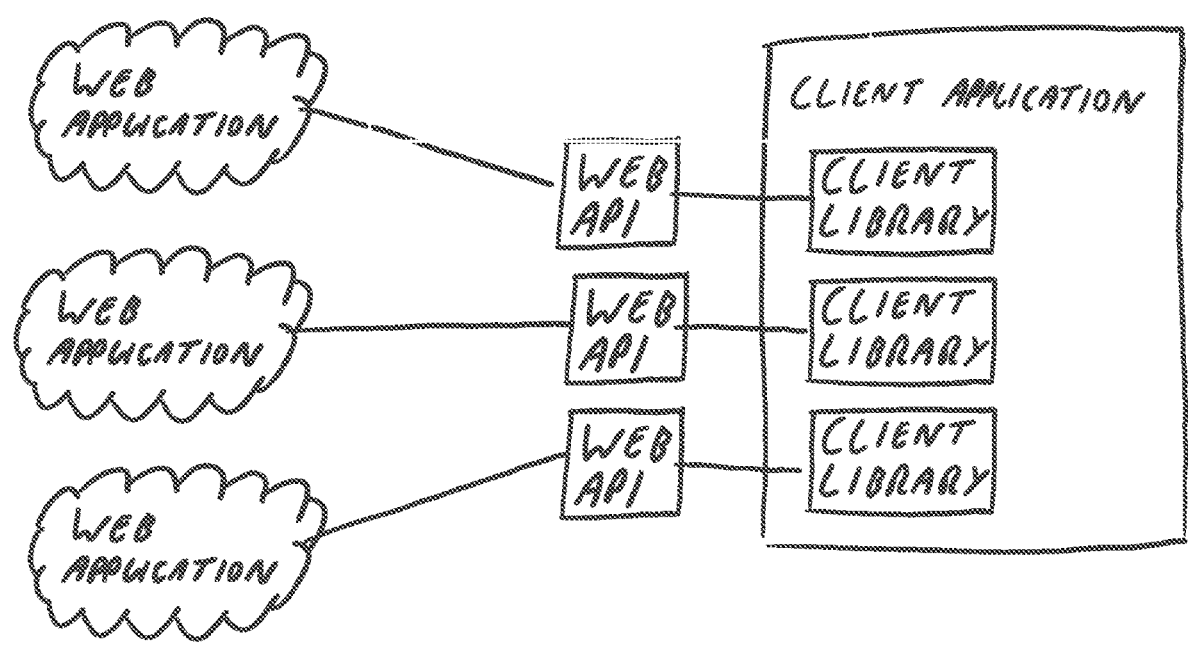
FIG. 1 provides a schematic diagram depicting the conventional manner in which client applications access services provided by web applications.

FIG. 1 provides a schematic diagram depicting the conventional manner in which client applications access services provided by web applications.

Each web application developer typically provides a web application programming interface (web API). Each web API provides the interface via which requests are made to the web application and via which responses are received. Commonly, each web API is provided associated with a corresponding "manifest".

A web API manifest comprises, for example, a XML, JSON or YAML file specifying the service operations available to client applications from the web application.

Typically, SOAP web services manifests are expressed in WSDL which is an XML dialect; REST web API manifests are often expressed in swagger (aka. OpenAPI), with two possible syntaxes: YAML or JSON, and GraphQL APIs use a dedicated syntax for its manifest (called a schema). This syntax borrows elements from JSON but is different from JSON.

More particularly, a typical web API manifest file may include definitions for the service operations exposed by the web API, as well as definitions for the structures of the request and response payloads of each service operation. Manifests use a powerful type description language that can describe arbitrary types composed of scalar values, arrays and records.

Conventionally, at development time, each web API manifest is used to generate a client library. The client library can be generated automatically from the manifest file to generate a "stub" or can be manually written.

The client library is integrated with the client application code and comprises code that implements requests to the web API and translates responses from the web API. Typically, the web API requests and web API responses provided by the client library are exposed to the client application code as methods or functions.

Conventionally, it is necessary to integrate in the client application code a client library (either automatically generated or manually written) for every web API the client application is going to use. As depicted in FIG. 1, this means that a client application calling multiple web APIs must integrate in the application code multiple client libraries.

As is explained in more detail below, in accordance with examples of the present invention, a technique is provided that enables a single generic library to replace the multiple client libraries normally required when a client application is accessing the services provided by multiple web applications.

Figure 2A:
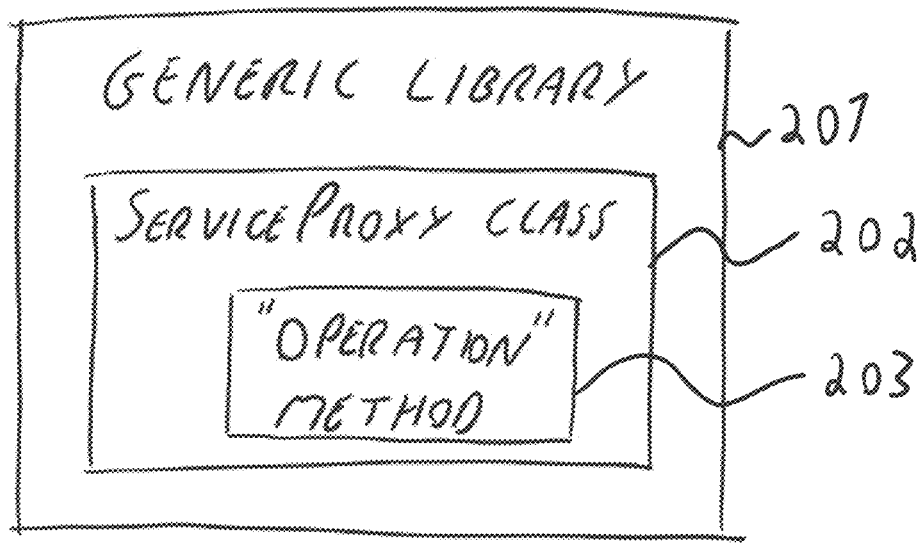
FIG. 2a provides a schematic diagram depicting a generic library file in accordance with certain embodiments of the invention.

FIG. 2a provides a schematic diagram depicting a generic library file 201 in accordance with certain embodiments of the invention. The generic library file 201 comprises code defining a "proxy" class 202 and an "operation method" 203.

The proxy class 202 is parameterized by a first defined type and the operation method 203 is parameterized as a second defined type which is constrained to be a key of the first defined type. Further, the first argument of the operation method is typed as "second defined type" and the return of the operation method is typed as "first defined type"["second defined type"].

In the example shown in FIG. 2a, the generic library file 201 comprises code defining a first proxy class, namely 'ServiceProxy' class 202 within which is defined a first operation method 203.

The ServiceProxy class 202 is a generic class which is parameterized by a 'ServiceT' type. The operation method 203 is a generic method which is parameterized by a 'K extends keyof ServiceT' type and its return is typed as 'ServiceT[K]'.

Figure 2B:
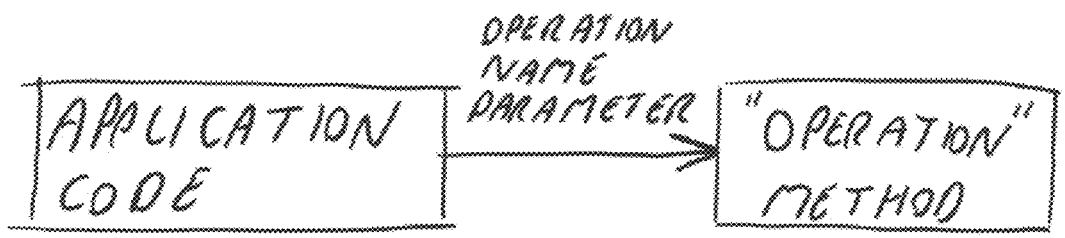
FIG. 2b provides a schematic diagram depicting generation of a function object in accordance with certain embodiments of the invention.
Figure 2B:
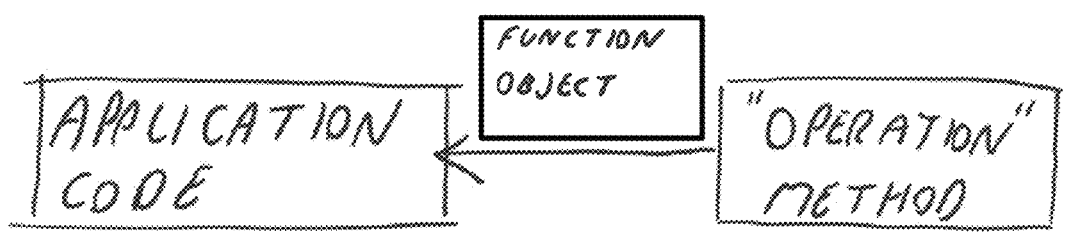

FIG. 2b provides a schematic diagram depicting how the operation method 203 operates.

When a web service operation provided by a web application is to be accessed by part of the client application code (this part of the client application code referred to as a "function caller"), an operation name parameter is passed to the 'operation' method 203. The 'operation' method 203 returns an operation function object to the function caller that can then be used to call that particular web service operation.

Figure 2C:
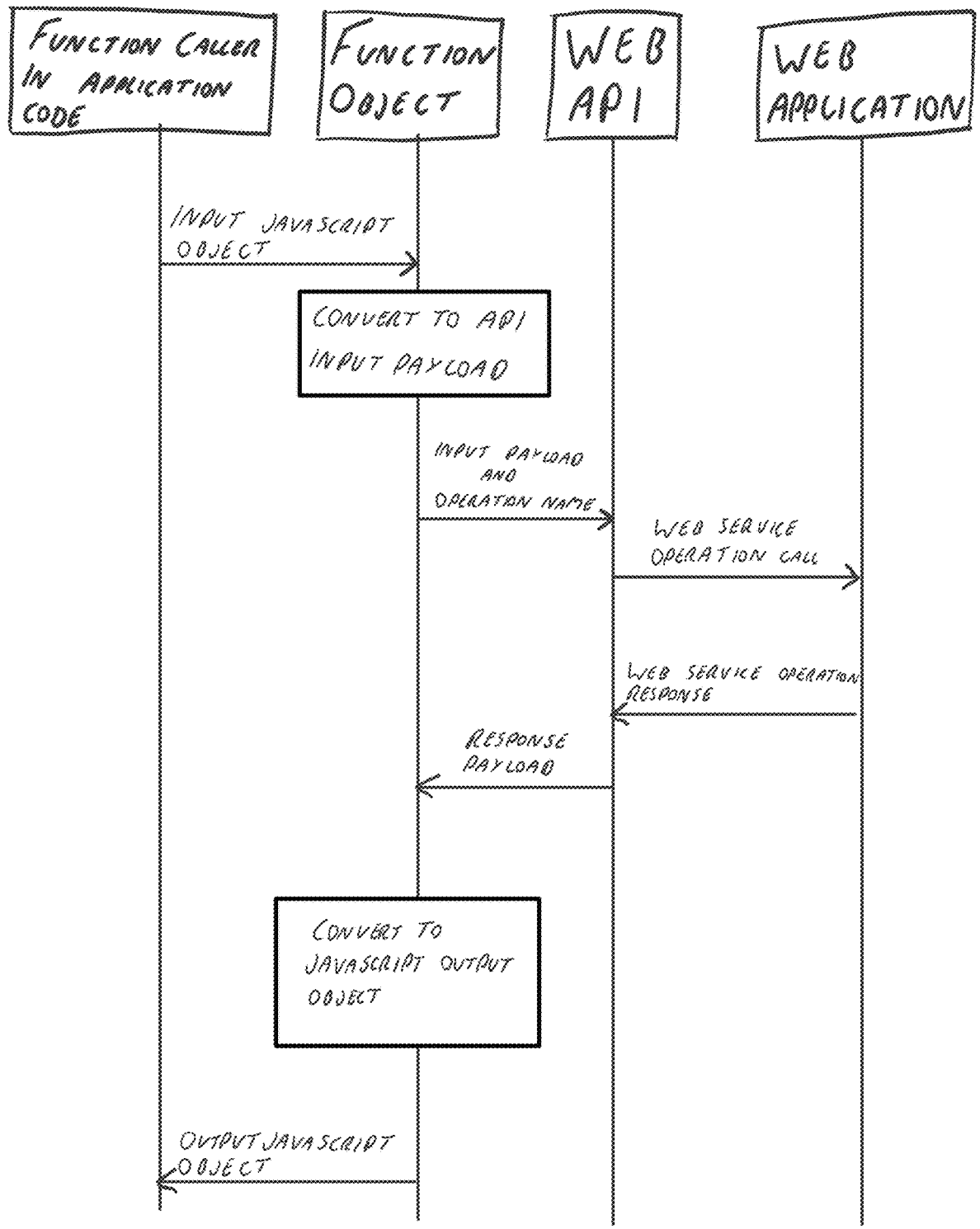
FIG. 2c provides a schematic diagram depicting operation of a function object in accordance with certain embodiments of the invention.

FIG. 2c provides a schematic diagram depicting how such an operation function object, generated and returned in this way, operates to provide an interface to one or more different web APIs enabling web service operations to be accessed via the client application code.

As described above, initially an operation name parameter (corresponding to the relevant web service operation) is passed to the operation method 203 by a function caller part of the client application code and a corresponding operation function object is generated and returned to the function caller.

The operation function object provides an interface between the function caller of the client application code and the web API.

To access the web service operation, the function caller passes an input to the operation function object in the form of a JavaScript object.

The operation function object then converts this input to an API input payload in a form which is expected by the web API. For example, to XML for SOAP or to a GraphQL query for GraphQL.

The operation function object then sends the operation name and the input payload to the web API, using the appropriate format. The operation name is passed in a suitable format, for example as an HTTP header and soapAction attribute in SOAP or via an HTTP method or URL for REST.

The web API passes the input payload to the relevant web service operation of the web application in the form of a web service operation call and the web application performs the requested service operation and generates a corresponding output which is sent to the web API in the form a web service operation response. In turn, the web API sends a response payload to the operation function object. The operation function object then converts the response payload to a JavaScript output object. The operation function object then returns the converted output JavaScript object to the function caller in the application code.

As will be understood, different operation function objects can be generated in this manner for any suitable web service supported by any suitable web API. There is therefore no requirement to specify particular code in the application code to interact with a particular web API. Consequently, and in contrast to usual techniques, only a single generic library is required to enable the application code to interact with multiple different web APIs, rather than the conventional requirement to provide a client library for each web API used by the application code.

In certain examples, the conversion between JavaScript input/output objects and the web API input/output payloads are provided with additional context to deal with protocol options.

For example, XML allows simple values to be passed either as elements or as attributes. The generic library can use a simple convention to distinguish between the two. For example, 'firstName: "Bob"' to format as an element and '$firstName: "Bob"' to format as an attribute.

Typically, the generic library 201 is specialized (i.e. written) for a particular web API protocol (e.g. one of (SOAP, REST, GraphQL) or a specific "flavour" of a web API protocol (e.g. OData, a flavour of REST).

This reduces the complexity of the library and the number of conventions needed for contextual formatting.

In conventional arrangements, each different web API input and web API output is defined by a class which is typically defined in a client library specific to the web API in question. Conventionally, these class definitions provide the means by which type checking is performed when the application code is being written. However, when client application code is being written to use a generic library of the type described above, there are no conventional client libraries present and therefore no such class definitions. Without such class definitions, such type checking cannot be undertaken as the client application code is being written.

In particular, in the context of the use of the generic library acting as an interface for the web API as described above, during code development there would be no means to ensure that the correct type for each operation function object is used in the client application code and to verify the type compatibility of the input JavaScript objects which are passed to, and the output JavaScript objects which are returned from, the operation function objects.

Accordingly, in accordance with certain embodiments of the invention, when the client application code is being written to be used with the generic library, it is written in TypeScript and written in conjunction with a special TypeScript definition file.

This TypeScript definition file is not deployed when the client application code is deployed, instead it is typically only used during development (whilst the client application code is being written) to ensure that the operation names are valid and that the input JavaScript objects and output JavaScript objects are correctly typed for a given operation function object.

Figure 3:
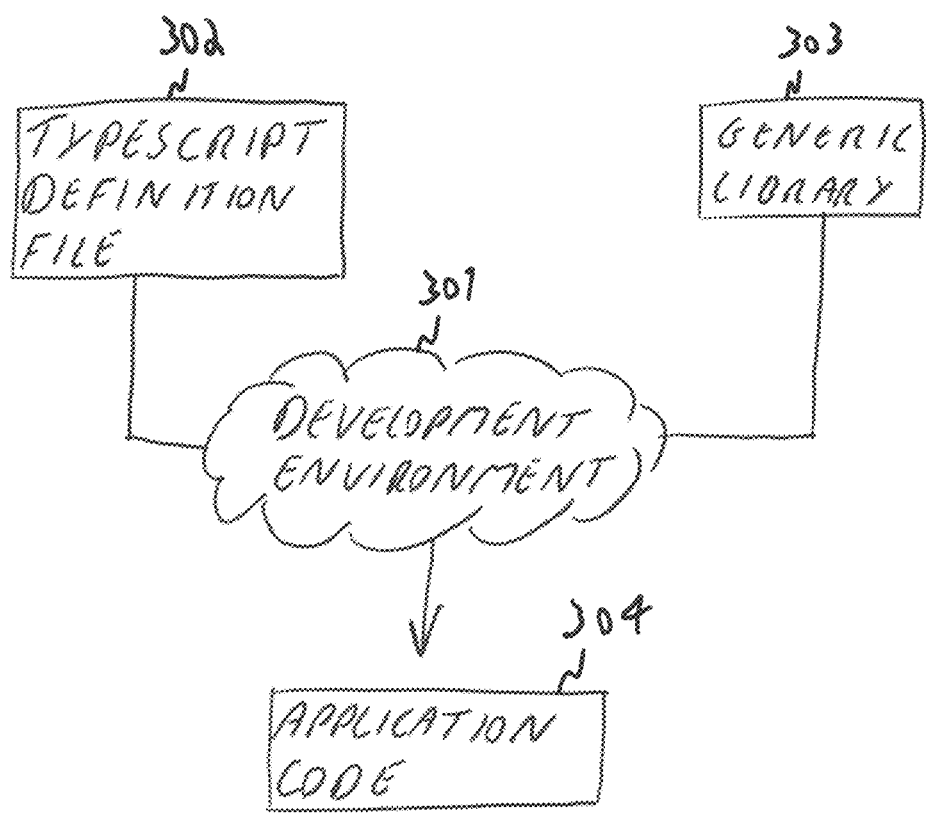
FIG. 3 provides a schematic diagram depicting a technique for writing application code in accordance with certain embodiments of the invention.
Figure 4:
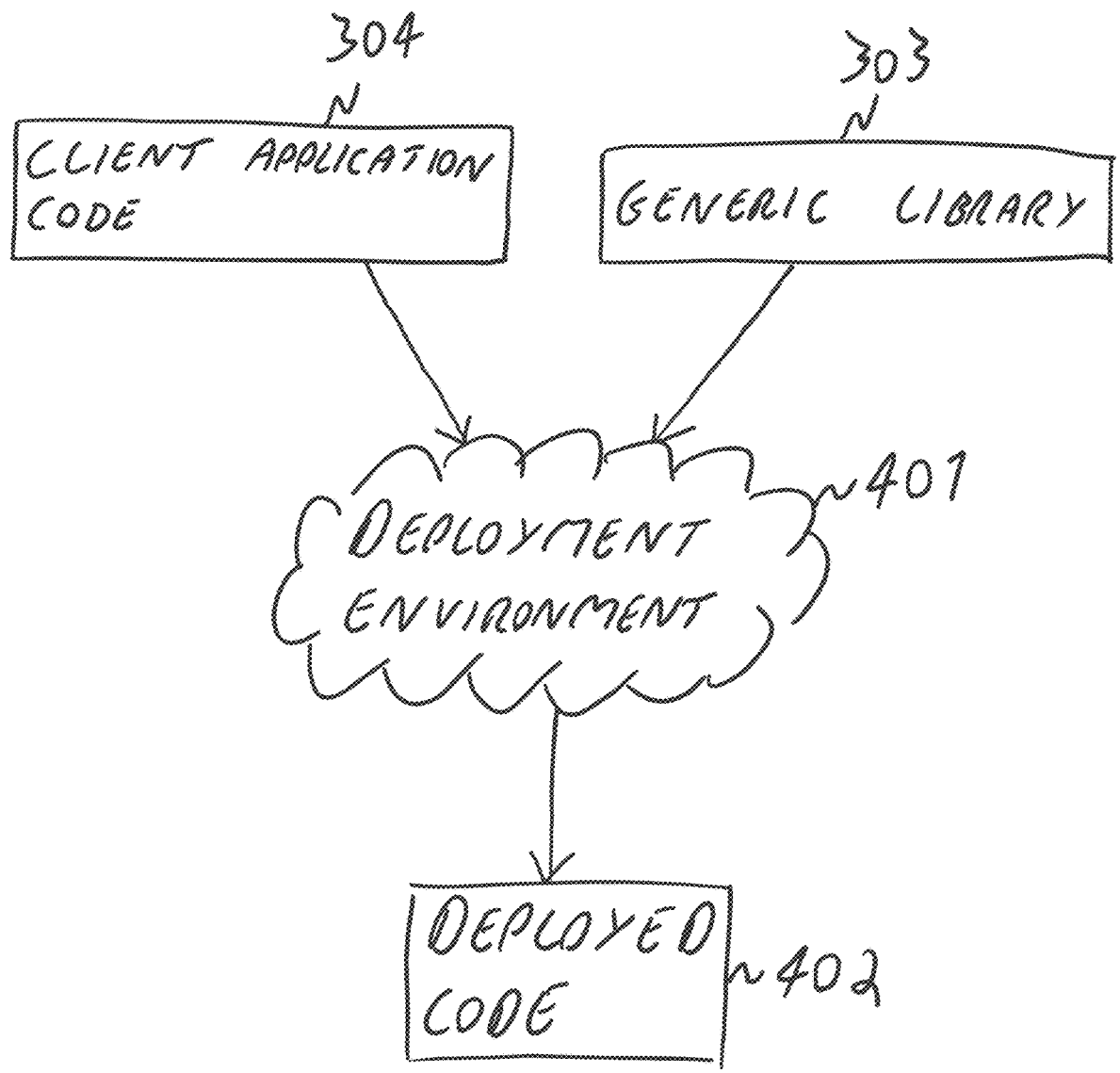
FIG. 4 provides a schematic diagram depicting a code deployment process in accordance with certain examples of the invention.

This concept is depicted with reference to FIGS. 3 and 4.

FIG. 3 provides a schematic diagram exemplifying a technique for writing application code in accordance with certain embodiments of the invention.

A code development environment 301 (comprising for example one or more developer terminals having access to conventional code development tools such as code editors and debuggers, a common code repository and so on) is provided with access to a TypeScript definition file 302 generated in accordance with the TypeScript definition file generation process described in more detail below. The code development environment 301 further has access to a generic library 303 of the type described above. Together, during the development phase, client application code 304 is written, in conjunction with the TypeScript Definition file 302 and the generic library 303. Typically, the client application code 304 is developed in TypeScript and then transpiled to JavaScript ahead of deployment.

FIG. 4 provides a schematic diagram illustrating a code deployment process in accordance with certain examples of the invention. A deployment environment 401 is provided comprising, for example, a package repository within which code packages are stored, and a package manager. The package repository includes the client application code 304 developed as described with reference to FIG. 2 and the generic library 303.

To deploy the application, typically the package manager of the deployment environment 401 combines, using known techniques, the client application code 304 developed as described with reference to FIG. 3 with the generic library 303, to generate deployed code 402. The deployed code 402 (comprising the JavaScript client application code 304 and the generic library 303) is communicated to a client device on which the deployed code is then compiled and run.

Figure 5A:
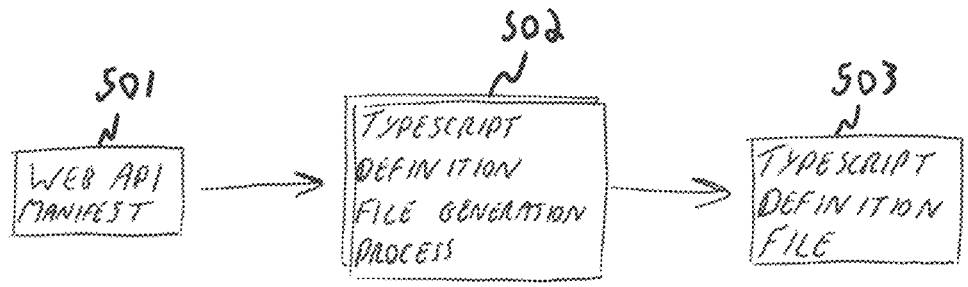
FIG. 5a provides a schematic diagram depicting the generation of a TypeScript definition file in accordance with certain embodiments of the invention.

As depicted in FIG. 5*a*, the TypeScript definition file is generated from the relevant web API manifest file in accordance with a definition file generation process. As can be seen in FIG. 5*a*, a web API manifest file 501 is input to a definition file generation process 502 which generates a corresponding TypeScript definition file 503.

Figure 5B:
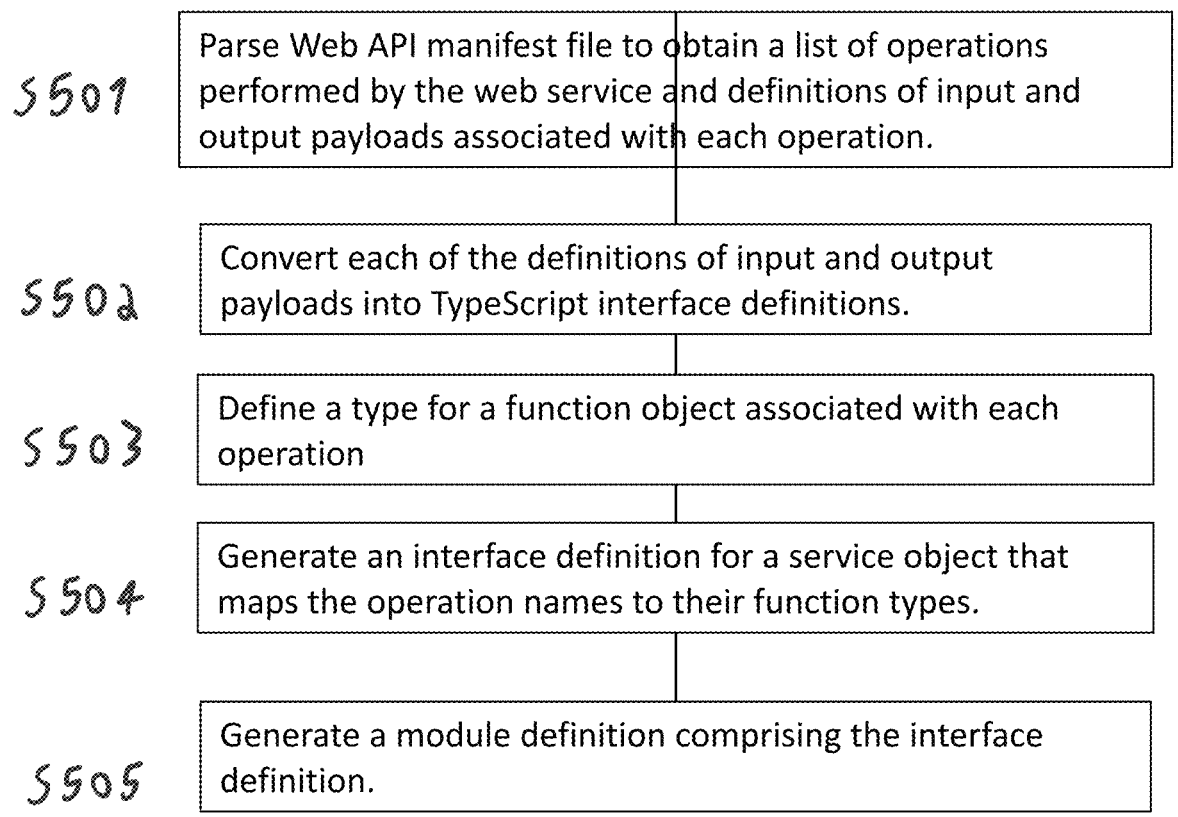
FIG. 5b provides a flow diagram depicting a process for generating a TypeScript definition file in accordance with certain embodiments of the invention.

FIG. 5*b* provides a diagram showing the steps of the definition file generation process 502.

In the definition file generation process 502 during a first stage S501, the web API manifest file 501 is parsed to obtain a list of web service operations performed by the web application to which the web API relates along with definitions of the input and output payloads associated with each web service operation.

During a second stage S502, the definitions of the input and output payloads are converted into TypeScript interface definitions For example, if a web service operation "ReadUser" has an input payload containing an id and an output payload containing id, "firstName" and "lastName", after the performance of the first and second step, 'interface ReadUserinput {id: number;}' and 'interface ReadUserOutput {id: number; firstName: string; lastName: string;}' will be generated for the input and output interfaces.

During a third stage S503, a type for an operation function object that takes the operation's input interface as parameter and that returns the operation's output interface is defined.

In the example operation "ReadUser" described above, 'type ReadUserOperation=(input: ReadUserInput)=>ReadUserOutput' would be generated.

During a fourth stage S504, an interface definition for an operation function object that maps the operation names to their function types is defined.

With reference to the example described above, assuming a function type for a CreateUser operation was also generated, this interface would be 'interface Service {readUser: ReadUserOperation; createUser: CreateUserOperation; ... }'.

Finally, during a fifth stage S505, the definition for the service interface (the interface definition) is placed in a module definition.

In this way a TypeScript definition file 503 is generated.

In accordance with the example described above, a TypeScript definition file is generated which comprises the following code components:

```
declare module "user-service" {
    // readUser definitions
    export interface ReadUserInput {
        id: number;
    }
    export interface ReadUserOutput {
        id: number;
        firstName: string;
        lastName: string;
    }
    export type ReadUserOperation = (input: ReadUserInput) =>
    ReadUserOutput;
    // createUser definitions
    export interface CreateUserInput {
        firstName: string;
        lastName: string;
    }
    export interface CreateUserOutput {
        id: number;
    }
    export type CreateUserOperation = (input: CreateUserInput) =>
    CreateUserOutput;
    // service definition
    export interface Service {
        readUser: ReadUserOperation;
        createUser: CreateUserOperation;
    }
}
```

As described above, when the client application code is being written, the TypeScript definition file is used by the development environment to ensure that, when the client application is run, input JavaScript objects and output JavaScript objects are correctly typed for a given operation function object.

For example, in the previous example, the 'ServiceProxy' class of the generic library is instantiated with the 'Service' interface provided by the TypeScript definition file.

From this, a suitable component of the development environment (for example a TypeScript compiler) can infer that the type parameter K of the 'operation' method is either '"readUser"' or '"createUser"'.

A compilation error will be generated in the development environment (e.g. by the TypeScript compiler) if another string is passed to this method.

Further, again a suitable component of the development environment (for example, a TypeScript compiler) will infer that 'service.operation('readUser')' returns a 'ReadUserOperation' while 'service.operation('createUser')' returns a 'CreateUserOperation' (this comes from the 'ServiceT[K]' generic type).

As it can obtain a precise type for each operation function object, the TypeScript compiler can verify type compatibility of the input TypeScript objects (corresponding to the input JavaScript objects of the client application code when it is transpiled from TypeScript to JavaScript) which are passed to and the output TypeScript objects (corresponding to the output JavaScript objects of the client application code when it is transpiled from TypeScript to JavaScript) returned from these operation function objects.

In one example, the generic library is instantiated in the client application code by calling:

myService=new ServiceProxy<MyService> (config) function where MyService is an API type definition provided by the TypeScript definition file.

In this way, in the application code:

myService.operation('readUser')({id: 103})

will be inferred as a function that returns a ReadUserOutput where ReadUserOutput is a type contained in the TypeScript definition foe. As the application code is being written, the parameter type will be inferred as ReadUserinput so the TypeScript compiler will be able to verify that the corresponding arguments have ReadUserinput properties (ID) and that the only ReadUserOutput properties (ID, firstName, lastName) are read from the result.

Figure 6:
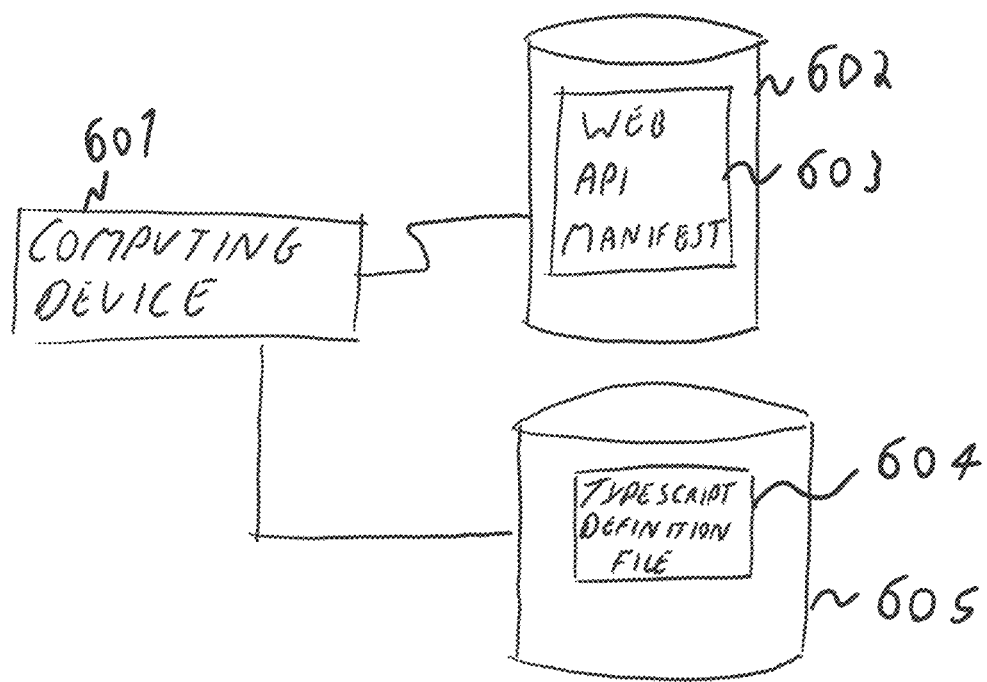
FIG. 6 provides a schematic diagram of a computing system for generating a TypeScript definition file in accordance with certain embodiments of the invention.
Figure 7:
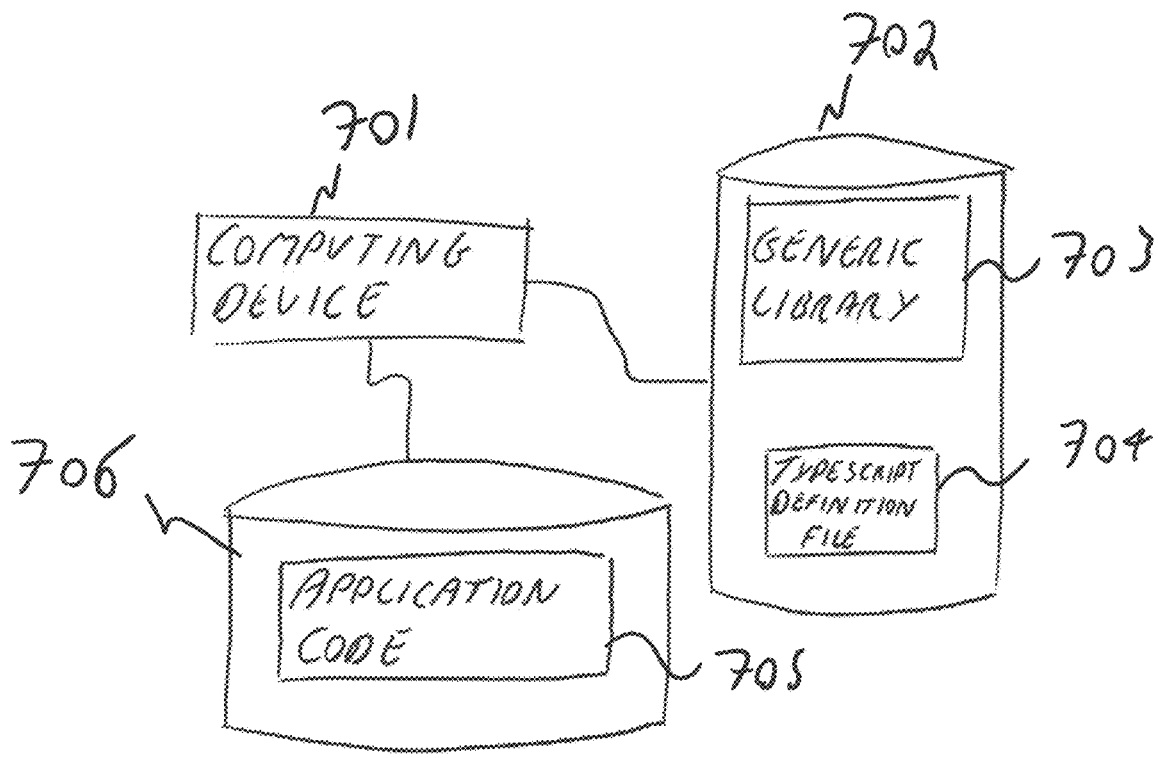
FIG. 7 provides a schematic diagram of a system for developing application code in accordance with certain embodiments of the invention, and FIG. 8 provides a schematic diagram of a system for accessing a web service via a web API in accordance with certain embodiments of the invention.
Figure 8:
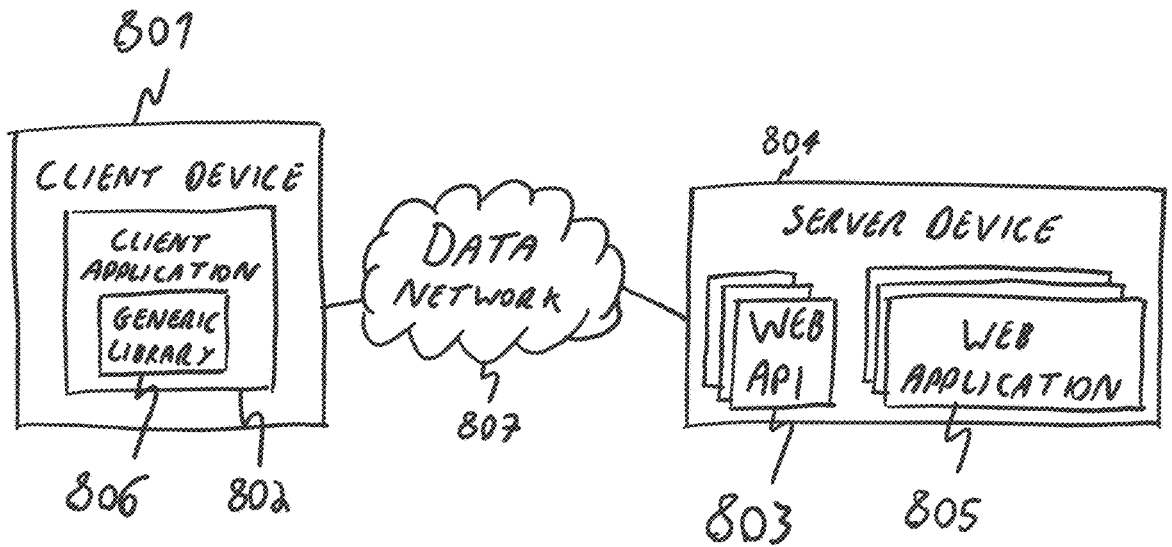

Embodiments of the invention can be implemented in any suitable way using conventional computing systems and conventional computing system techniques as are well known in the art, FIGS. 6, 7 and 8 provide simplified schematic diagrams depicting example implementations.

FIG. 6 provides a schematic diagram of a computing system for generating a TypeScript definition file in accordance with certain embodiments of the invention.

A computing device 601 is provided (for example a personal computer or similar computing device) on which is running software providing a TypeScript definition file generation process as described with reference to FIG. 5. The computing device has access to a first memory storage device 602 via a suitable data interface on which is stored a copy of a web API manifest file 603.

The software running on the computing device 601 is configured to retrieve the web API manifest file 603 from the memory storage device 602 and to perform the TypeScript definition file generation process to generate an output TypeScript definition file 604 as described above and communicate, via a suitable data interface, the output TypeScript definition file 604 to a second memory device 605.

FIG. 7 provides a schematic diagram of a system for developing application code in accordance with certain embodiments of the invention.

A computing device 701 (for example a personal computer) is provided on which is running software providing code development tools, for example a code editor, code debugger, TypeScript compiler and so on. In certain examples, multiple such computing devices may be provided connected via suitable data connections, each computing device operated by a code developer of a team of code developers. The computing device 701 has access to a memory device 702 on which is stored a generic library 703 and a TypeScript definition file 704 generated from a web API manifest file as described above. The code development tools running on the computing device 701 enables a code developer to write application code for accessing a web service via a web API using a generic library as described above. Application code 705 is then communicated from the computing device 701, via a suitable data connection, to a memory device 706. Typically, the memory device 706 comprises a code repository, from where the application code can be deployed (e.g. downloaded to a client device, compiled and executed).

The code development tools, and in particular the code editor running on the computing device 701 has access to the generic library 703 and a TypeScript definition file 704 which, as described above, ensure that type compatibility on the TypeScript objects which are passed to and returned from the operation function objects is correct and verified as the code is being written.

FIG. 8 provides a schematic diagram of a system, arranged in accordance with certain embodiments of the invention, which is arranged to access one or more web services via one or more corresponding web APIs.

The system is arranged to deploy code that is developed as described above (e.g. written in a code development environment with access to a TypeScript definition file generated in accordance with a TypeScript definition file generating process as described above) and that comprises a generic library.

A client device 801, provided by a suitable computing device such as an application server or similar has software running thereon comprising an application 802 which comprises deployed code. The deployed code comprises application code (JavaScript code), developed as described above and which comprises the generic library 806. The application code is converted to executable code by a just-in-time (JIT) compiler when the application 802 is run on the client device 801.

The system further includes a server device 804, provided by a suitable computing device such as an application server or similar, that has running thereon software providing a number of web applications 805, each web application providing one or more web services.

The application 802 communicates requests to the web APIs 803 using the techniques described above which in turn generate web service operation calls to access the relevant web services provided by relevant web applications 805 running on the server device. The web applications 805 generate corresponding web service operation responses which are communicated via the relevant web API 803 which in turn communicates the responses to the application 802, again using the techniques described above.

The client device 801 and the server device 804 communicate via a data network 807 which can be provided by any suitable data network as are well known in the art.

FIG. 8 shows a single server device 804 on which is running multiple web applications 805 with corresponding multiple web APIs 803. However, it will be understood that in other embodiments, the system can comprise multiple different server devices on which are running one or more web applications with corresponding web APIs.

In some examples, the application 802 could be integrated with another application such as a web browser running on a client device.

With reference to FIG. 8 in particular, it will be understood that the provision of the generic library provides a particular technical advantage because the requirement for multiple client libraries is obviated as the generic library 806 can operate with multiple different web APIs.

All of the features disclosed in this specification (including any accompanying claims, abstract and drawings), and/or all of the steps of any method or process so disclosed, may be combined in any combination, except combinations where at least some of such features and/or steps are mutually exclusive. Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features. The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

It will be appreciated that various embodiments of the present disclosure have been described herein for purposes of illustration, and that various modifications may be made without departing from the scope of the present disclosure. Accordingly, the various embodiments disclosed herein are not intended to be limiting, with the true scope being indicated by the following claims.

The invention claimed is:

1. A method of accessing a web service of a web application via a web application programming interface (API), said method comprising:
   deploying, to a client device, client application code comprising a generic client library, said client application code comprising code for accessing the web service of the web application via the web API, and
   running the client application code on the client device to:
   communicate a web service operation call to the web API, running on a server device, via an interface, and
   receive a web service operation response from the web API via the interface, wherein:
   said generic client library comprises code defining a first proxy class within which is defined a generic operation method, said operation method configured such that responsive to receipt of an operation name parameter corresponding to a web service operation performed by the web application from a function caller of the client application code, the operation method returns an operation function object, said operation function object providing the interface between the client application code and the web API.

2. A method according to claim 1, wherein the interface is implemented by a process comprising the steps of:
   communicating, by the function caller of the client application code, an input to the operation function object corresponding to the web service operation call;
   converting, by the operation function object, the input to an input payload suitable for receipt by the web API and processing by the web service;
   communicating, by the operation function object, the input payload to the web API with a corresponding operation name;
   receiving, by the operation function object, an output payload from the web API;
   converting, by the operation function object, the output payload to an output corresponding to the web service operation response, and
   communicating the output to the function caller of the client application code.

3. A method according to claim 2, wherein the input to the operation function object communicated from the function caller of the client application code is a JavaScript object.

4. A method according to claim 3, wherein the output from the operation function object communicated to the function caller of the client application code is a JavaScript object.

5. A method according to claim 4, wherein the client application code is client application code that has been written in conjunction with a TypeScript definition file, said TypeScript definition file defining typing information associated with the web API, enabling the type compatibility of the JavaScript objects which are passed to and returned from the operation function object to be verified during development.

6. A method according to claim 5, wherein the TypeScript definition file 1s a TypeScript definition file generated from manifest file associated with the web API.

7. A method according to claim 6, wherein generating the TypeScript definition file comprises:
   parsing the manifest file to obtain a list of operations performed by the web service and definitions of input and output payloads associated with each operation;
   converting each of the definitions of input and output payloads into TypeScript interface definitions;
   defining a type for an operation function object associated with each operation;
   generating an interface definition for a service object that maps the operation names to their function types, and
   generating a module definition comprising the interface definition.

8. A method according to claim 7, wherein the first proxy class is parameterized by a first defined type and the operation method is parameterized as a second defined type which is constrained to be a key of the first defined type, the first argument of the operation method being typed as 'second defined type' the return of the operation method being typed as 'first defined type [ second defined type] '.

9. A method according to claim 8, wherein the generic library comprises code implementing a convention to distinguish between Extensible Markup Language (XML) elements and XML attributes in input JavaScript objects.

10. A method according to claim 9, wherein the generic library is configured for an operation with a specific web API protocol.

11. A method according to claim 10, wherein the web API protocol is one of simple object access protocol (SOAP), representational state transfer (REST) or GraphQL.

12. A method of generating a TypeScript definition file for use in the method of claim 5, said method comprising:
    parsing a manifest file to obtain a list of operations performed by a web service and definitions of input and output payloads associated with each operation;
    converting each of the definitions of input and output payloads into TypeScript interface definitions;
    defining a type for a function associated with each operation;
    generating an interface definition for a service object that maps the operation names to their function types, and
    generating a module definition comprising the interface definition.

13. A generic client library for use in a method according to claim 1, said generic client library comprising computer code which when run on a suitable computing device defines a first proxy class within which is defined a generic operation method, wherein said operation method is configured such that responsive to receipt of an operation name parameter corresponding to a web service operation performed by a web service from a function caller of the client application code, the operation method is configured to return an operation function object, said operation function object providing an interface between the function caller of the client application code and a web API.

14. A generic client library according to claim 13, wherein the interface is implemented by a process comprising the steps of:
    receiving, from the function caller of the client application code, an input to the operation function object corresponding to a web service operation call;
    converting, by the operation function object, the input to an input payload suitable for receipt by the web API and processing by the web service;
    communicating, by the operation function object, the input payload to the web API with a corresponding operation name;
    receiving, by the operation function object, an output payload from the web API;
    converting, by the operation function object, the output payload to an output corresponding to the web service operation response, and communicating the output to the function caller of the client application code.

15. A generic client library according to claim 14, wherein the input to the operation function object communicated from the function caller of the client application code is a JavaScript object.

16. A generic client library according to claim 15, wherein the output from the operation function object communicated to the function caller of the client application code is a JavaScript object.

* * * * *